Nov. 9, 1937.　　　F. J. PARDIECK　　　2,098,515

VALVE HANDLE

Filed Nov. 18, 1935

Inventor
FRANK J. PARDIECK,

By

Attorneys

Patented Nov. 9, 1937

2,098,515

UNITED STATES PATENT OFFICE 2,098,515

VALVE HANDLE

Frank J. Pardieck, Indianapolis, Ind.

Application November 18, 1935, Serial No. 50,297

4 Claims. (Cl. 287—53)

It is the object of my invention to produce for use on faucets and other plumbing fixtures having rotatable valve-stems a handle and handle-mounting means which can be used on valve-stems of a wide variety of diameters and which, when in place, will be rather accurately centered relative to the valve-stem and firmly secured thereto.

In carrying out my invention I provide a handle having an axial recess of a diameter equal to the largest valve-stem to which the handle is to be applied, and I provide in the cylindrical wall of such recess a series of angularly spaced longitudinally extending grooves, preferably four in number. Such grooves are of a depth to receive rather closely the wings of a keying element which is in general of cruciform cross-section. To apply the device to a valve-stem of a faucet or other fixture, the end of the valve-stem is provided with longitudinally extending slots in diametral planes, the keying element is dropped into these slots, and the handle is then placed over the end of the valve-stem with the outer edges of the wings of the keying element received in the grooves of the handle. At diametrically opposite points and between the grooves, the handle may be provided with set-screws which serve to prevent removal of the handle and, at the same time, to force into clamping engagement with the keying element the segments into which the end of the valve-stem has been divided by the slots.

Figure 1:
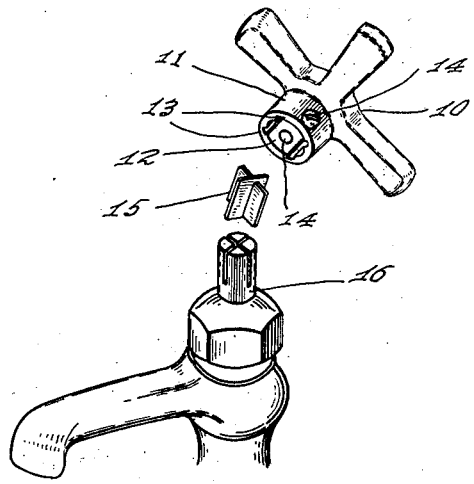
Figure 2:
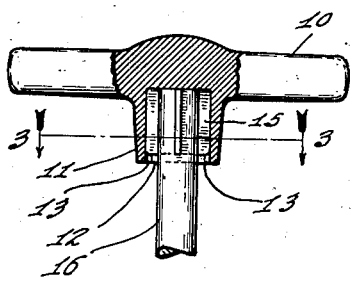
Figure 3:
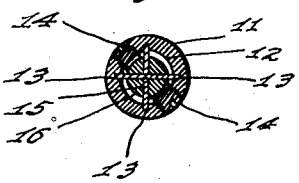

The accompanying drawing illustrates my invention: Fig. 1 is a perspective view illustrating the handle and keying element removed from the valve-stem; Fig. 2 is a side elevation of the valve-stem with the handle in place on the end thereof, the central portion of the handle being broken away; and Fig. 3 is a horizontal section on the line 3—3 of Fig. 2.

The handle may take any desired form. The handle 10 shown in the drawing is of the four-arm type and has a central hub 11 provided with an axial recess 12 of a diameter sufficient to receive the largest valve-stem to which the handle may be applied. The cylindrical wall of the recess 12 is provided with four equally spaced longitudinally extending grooves or key-ways 13, and set screws 14 are provided at diametrically opposite points in the hub and between the grooves 13.

The keying element previously referred to is indicated at 15 and conveniently is composed of two similarly shaped pieces of sheet-metal each provided with a central longitudinally extending slot of a width sufficient to receive the other and of a length adequate to permit the two pieces to be assembled into longitudinally co-extensive relationship. Each piece of sheet-metal forming the keying element has a width sufficient to permit it to be rather closely received within two opposite grooves 13 in the handle-hub 11.

In applying the device described to a valve-stem 16, the valve-stem is slotted, as with a hack-saw, to provide two axially extending slots in planes at right angles to each other, such slots being of a width sufficient to permit the reception of the keying element. After the valve-stem has been slotted, the keying element is dropped in place in the slots and the handle is placed in position, as indicated in Fig. 2, with the outer edges of the wings of the keying element received in the grooves 13. The set-screws 14 are then tightened to prevent removal of the handle 10 and to collapse the slotted end of the valve-stem 16 into firm engagement with the wings of the keying element, thus preventing any possibility of lost-motion between the handle and valve-stem.

Since the handle is supported upon the keying member and since the keying member is centered on the valve-stem by the slots therein, it will be apparent that the handle will be centered on the valve-stem even if the stem is materially smaller in diameter than the recess 12. Thus the handle is adapted to be mounted in axial position on valve-stems of a wide variety of diameters. As the edges of the wings of the keying element 15 are snugly received in the grooves 13, and as the set-screws 14 collapse the end of the valve-stem into gripping engagement with the wings of the keying element, the handle is held firmly in place without any lost-motion.

I claim as my invention:

1. In combination, a valve having a rotatable valve-stem provided in its end with two longitudinally extending slots, a cruciform keying element disposed in said slots, a handle having a central recess provided with longitudinally extending grooves adapted to receive the edges of said cruciform element, and one or more set-screws mounted in said handle in position to engage said valve-stem between adjacent slots therein.

2. In combination, a valve having a rotatable valve-stem provided with a longitudinally extending slot, a keying element seated in said slot and projecting laterally on opposite sides thereof, a handle having a central recess large enough to receive the end of said valve-stem, the wall of said recess being provided with grooves for the reception of the edges of said keying element, and means carried by the handle for collapsing the slotted end of the valve-stem into gripping engagement with said keying element.

3. In combination, a valve having a rotatable valve-stem provided with a longitudinally extending slot, a keying element seated in said slot and projecting laterally on opposite sides thereof, a handle having a central recess large enough to receive the end of said valve-stem, the wall of said recess being provided with grooves for the reception of the edges of said keying element, and a set-screw carried by the handle for collapsing the slotted end of the valve-stem into gripping engagement with said keying element.

4. A handle for valve-stems of varying diameters, comprising a handle-member having a central recess for the reception of the largest valve-stem with which the handle is to be used, the wall of said recess being provided with four longitudinally extending grooves, a cruciform keying element closely receivable within said grooves, and two set-screws mounted in said handle at diametrically opposite points and between said grooves.

FRANK J. PARDIECK.